US009543654B2

(12) United States Patent
Li et al.

(10) Patent No.: US 9,543,654 B2
(45) Date of Patent: Jan. 10, 2017

(54) NFC ANTENNA

(71) Applicants: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nantou County (TW)

(72) Inventors: Cheng Ta Li, Nantou County (TW); Hung Wei Chiu, Nantou County (TW); Jui-Chih Chien, Nantou County (TW)

(73) Assignees: UNIVERSAL SCIENTIFIC INDUSTRIAL (SHANGHAI) CO., LTD., Shanghai (CN); UNIVERSAL GLOBAL SCIENTIFIC INDUSTRIAL CO., LTD., Nantou County (TW)

( * ) Notice: Subject to any disclaimer, the term of this patent is extended or adjusted under 35 U.S.C. 154(b) by 184 days.

(21) Appl. No.: 14/532,052

(22) Filed: Nov. 4, 2014

(65) Prior Publication Data

US 2015/0333404 A1 Nov. 19, 2015

(30) Foreign Application Priority Data

May 14, 2014 (TW) .............................. 103117013 A (51) Int. Cl.
*H01Q 7/00* (2006.01)
*H01Q 1/38* (2006.01)
*H04B 5/00* (2006.01)

(52) U.S. Cl.
CPC .................. *H01Q 7/00* (2013.01); *H01Q 1/38* (2013.01); *H04B 5/0081* (2013.01)

(58) Field of Classification Search
CPC .................................... H01Q 1/38; H01Q 7/00
(Continued)

(56) References Cited

U.S. PATENT DOCUMENTS 2,297,466 A * 9/1942 Funke ...................... H01Q 7/00
343/764
4,155,091 A * 5/1979 Vorie ..................... H01Q 21/29
343/728
(Continued)

FOREIGN PATENT DOCUMENTS

CN 101233532 B 4/2011
CN 101304116 B 1/2012
(Continued)

OTHER PUBLICATIONS

Taiwan Patent Office, Office action issued on Mar. 22, 2016.

*Primary Examiner* — Tho G Phan
(74) *Attorney, Agent, or Firm* — Li & Cai Intellectual Property (USA) Office (57) ABSTRACT

The disclosure illustrates a NFC antenna. The NFC antenna includes a first radiating portion and a second radiating portion. The first radiating portion is formed by a first conducting wire surrounding an axis core. The second radiating portion is formed by a second conducting wire surrounding the same axis core based on a surrounding direction which the first radiating portion surrounds the axis core. A second signal input terminal of the second radiating portion is electrically connected to a first signal input terminal of the first radiating portion. An open end of the second radiating portion is disposed proximately to a first signal output terminal. Thus, the NFC antenna can reduce the interferences affected from surrounding metal elements, and improve a quality factor of the NFC antenna.

12 Claims, 5 Drawing Sheets

(58) Field of Classification Search
USPC .................. 343/741, 742, 866, 867, 895
See application file for complete search history.

(56) References Cited

U.S. PATENT DOCUMENTS

| | | |
|---|---|---|
| 5,526,007 A | 6/1996 | Murakami et al. |
| 5,602,556 A | 2/1997 | Bowers |
| 6,501,437 B1 * | 12/2002 | Gyorko .................. H01Q 1/362 343/700 MS |
| 8,378,917 B2 * | 2/2013 | Yoneda .................. H01Q 1/22 343/742 |
| 2002/0122011 A1 * | 9/2002 | Teshima .................. H01Q 1/36 343/895 |
| 2009/0008449 A1 | 1/2009 | Qing et al. |
| 2012/0206309 A1 | 8/2012 | Lavedas et al. |

FOREIGN PATENT DOCUMENTS

| | | |
|---|---|---|
| CN | 101383446 B | 7/2012 |
| WO | WO 03044892 A1 | 5/2003 |
| WO | WO 2007015205 A1 | 2/2007 |

* cited by examiner

NFC ANTENNA

BACKGROUND

1. Technical Field

The present disclosure relates to a NFC antenna, in particular, to a NFC antenna reducing interferences affected by metal elements.

2. Description of Related Art

A conventional near field communication (NFC) antenna can be formed by ring type conductors and disposed surrounding a screen and a keyboard of an electronic device, such that the electronic device can communicate with other electronic devices by using a point-to-point contactless communication.

Figure 1A:
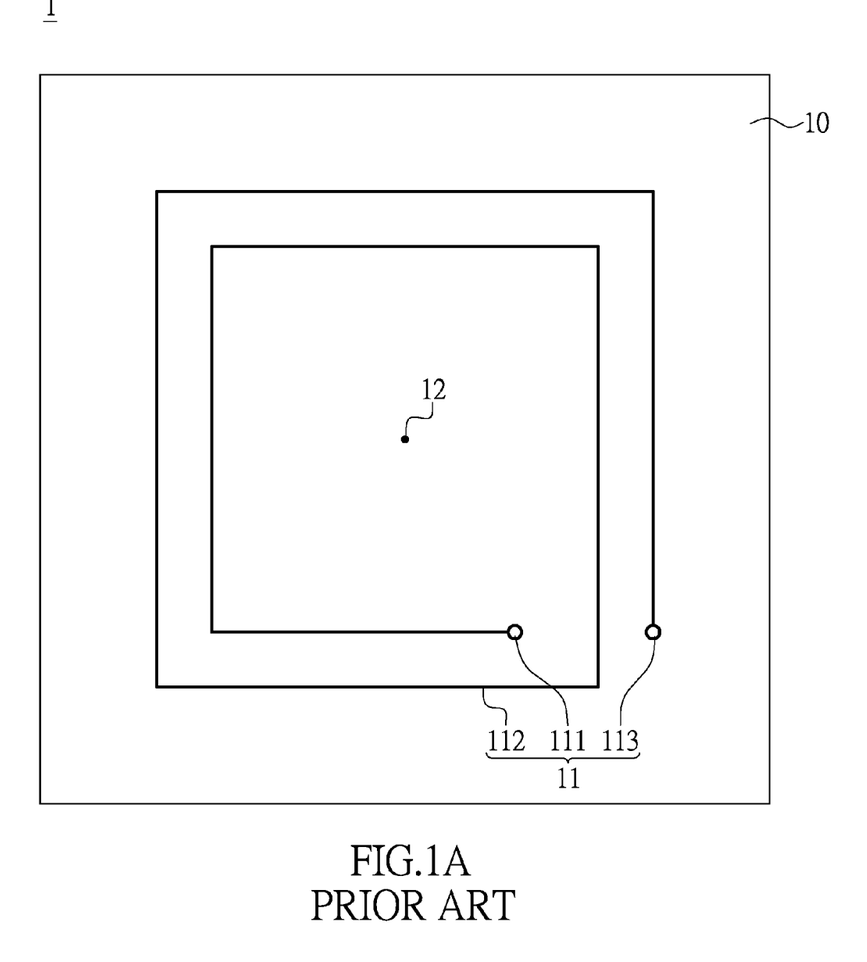
FIG. 1A is a schematic diagram of a conventional NFC antenna.

For example, refer to FIG. 1A, which shows a schematic diagram of the conventional NFC antenna. The conventional NFC antenna 1 includes a radiating portion 11 and a dielectric layer 10. The radiating portion 11 is disposed on one side of the dielectric layer 10. The radiating portion 11 includes a signal input terminal 111, a conducting wire 112 and a signal output terminal 113. The conducting wire 112 is electrically connected to the signal input terminal 111 and the signal output terminal 113. The conducting wire 112 surrounds an axis core 12 with multiple circles and formed a spiral structure. The signal input terminal 111 is not electrically connected to the signal output terminal 113.

Figure 1B:
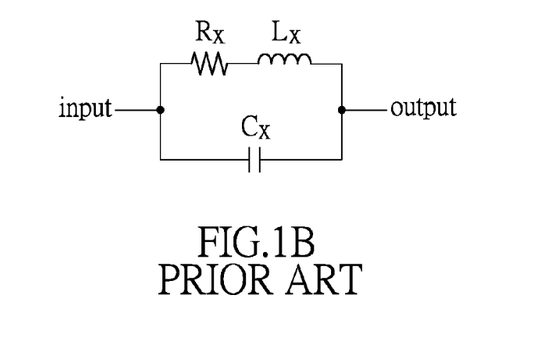
FIG. 1B is an equivalent circuit of the conventional NFC antenna.

Furthermore, referring to FIG. 1B, which shows an equivalent circuit of the conventional NFC antenna. In FIG. 1B, the equivalent circuit of the conventional NFC antenna 1 is mainly formed by an inductor Lx. However, the inductor Lx is not an ideal inductor, such that the conventional NFC antenna 1 exists also as a parasitic capacitor Cx and a parasitic resistor Rx. Hence, when the electronic device disposed with the conventional NFC antenna 1 communicates with a reader disposed with the conventional NFC antenna 1, if the conventional NFC antenna 1 has a low quality factor (Q factor) and the conventional NFC antenna 1 of the reader is affected by metal elements surrounding the reader, both of the quality factor of the conventional NFC antenna 1 and a transmission distance between the electronic device and the reader are decreased.

SUMMARY

An exemplary embodiment of the present disclosure provides a NFC antenna. The NFC antenna comprises a first radiating portion and a second radiating portion. The first radiating portion is formed by a first conducting wire surrounding an axis core, and the first radiating portion comprises a first signal input terminal. The second radiating portion is formed by a second conducting wire surrounding the same axis core and based on a surrounding direction with which the first radiating portion surrounds the axis core, and the second radiating portion comprises a second signal input terminal. The second signal input terminal is electrically connected to the first signal input terminal.

In accordance with an embodiment of the present disclosure, wherein the first radiating portion further comprises a first signal output terminal, and the second radiating portion further comprises an open end. The open end is disposed proximately to the first signal output terminal.

In accordance with an embodiment of the present disclosure, wherein the first conducting wire is electrically connected to the first signal input terminal and the first signal output terminal. The second conducting wire is electrically connected to the second signal input terminal and the open end.

In accordance with an embodiment of the present disclosure, wherein the second radiating portion is disposed inside the first radiating portion.

In accordance with an embodiment of the present disclosure, wherein the second radiating portion is disposed outside the first radiating portion.

In accordance with an embodiment of the present disclosure, wherein the first conducting wire surrounds the axis core with a spiral structure.

In accordance with an embodiment of the present disclosure, wherein the spiral structure is a square ring structure.

In accordance with an embodiment of the present disclosure, wherein the second conducting wire surrounds the axis core by at least one ring.

To sum up, the NFC antenna provided by the exemplary embodiment of the present disclosure can reduce the interferences affected from the surrounding metal elements through disposing a second radiating portion, such that the quality factor of the NFC antenna can be improved.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

First Exemplary Embodiment

Figure 2A:
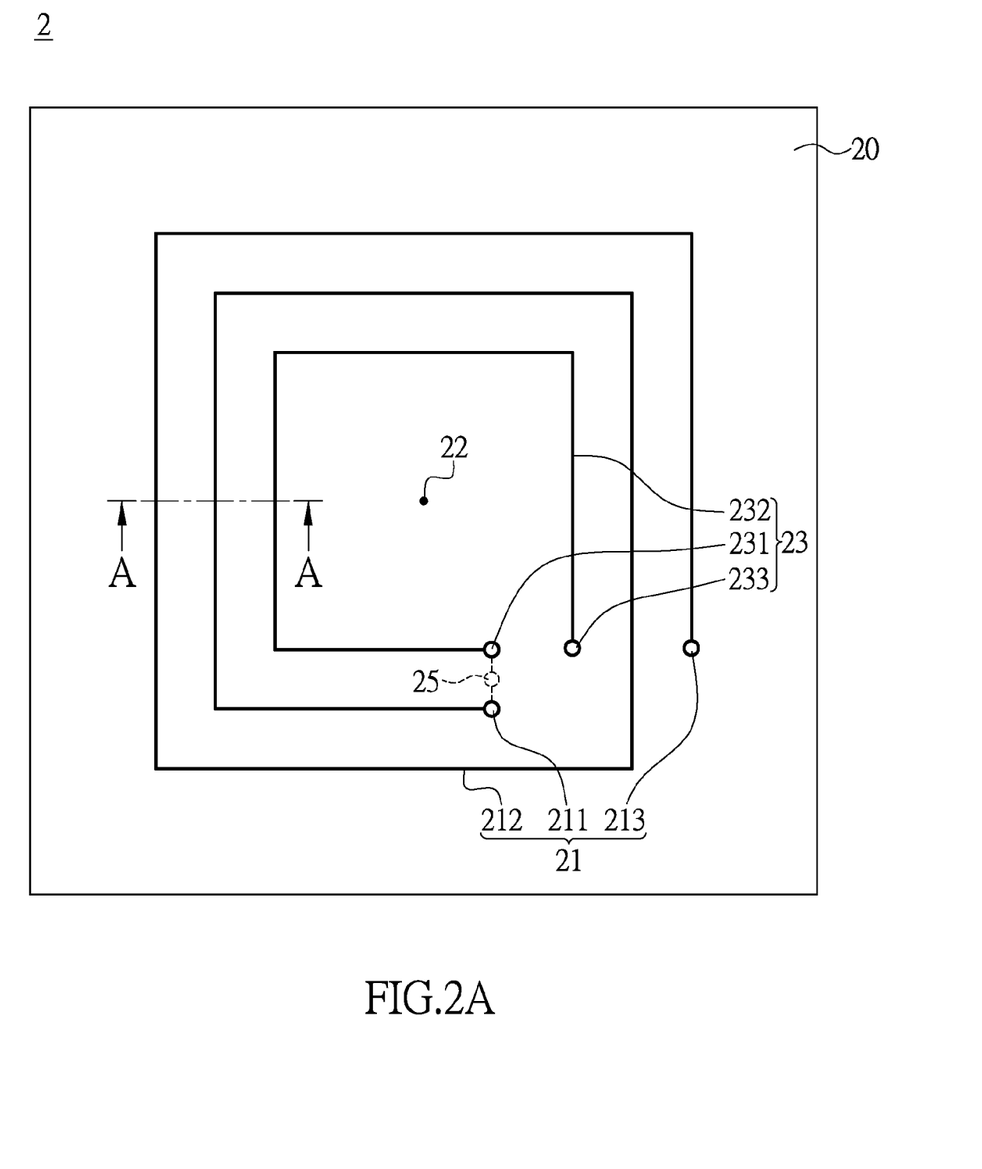
FIG. 2A is a schematic diagram of a NFC antenna in accordance with a first exemplary embodiment of the present disclosure.

First, please refer to FIG. 2A, which shows a schematic diagram of a NFC antenna in accordance with a first exemplary embodiment of the present disclosure. The NFC antenna 2 is disposed on a dielectric layer 20. The NFC antenna 2 includes a first radiating portion 21 and a second radiating portion 23.

To put it concretely, the dielectric layer 20 includes two surfaces which are opposite to each other, and the dielectric layer 20 can be a multilayer structure or a single layer structure. As shown in FIG. 2A, both of the first radiating portion 21 and the second radiating portion 23 are formed on an upper surface of the dielectric layer 20. Further, the first radiating portion 21 includes a first signal input terminal 211, a first conducting wire 212 and a first signal output terminal 213. The first conducting wire 212 is electrically connected to the first signal input terminal 211 and the first signal output terminal 213. The first conducting wire 212 surrounds an axis core 22 and forms the first radiating portion 21 with a spiral structure. The first conducting wire 212 is started by the first signal input terminal 211 and surrounds the axis core 22 from the inside out forming the spiral structure. That is to say, the first signal input terminal 211 is disposed inside the first radiating portion 21, and the first signal output terminal 213 is disposed outside the first radiating portion 21. Also, the first signal input terminal 211 and the first signal output terminal 213 do not electrically connect to each other.

The second radiating portion 23 includes a second signal input terminal 231, a second conducting wire 232 and an open end 233. In addition, the second conducting wire 232 is started by the second signal input terminal 231 and surrounds the axis core 22 based on a surrounding direction with which the first radiating portion 21 surrounds the axis core 22, such that the second radiating portion 23 is formed. That is to say, both of the first conducting wire 212 and the second conducting wire 232 surround the same axis core 22 with the same surrounding direction, and form the first radiating portion 21 and the second radiating portion 23 respectively.

It is worth noting that, in the exemplary embodiment, the second signal input terminal 231 is disposed corresponding to the first signal input terminal 211. The first signal input terminal 211 and the second signal input terminal 231 are coupled to the same signal source 25. Thus, the first signal input terminal 211 and the second signal input terminal 231 are electrically connected to each other. On the other hand, the open end 233 is disposed proximate to the first signal output terminal 213.

Figure 2B:
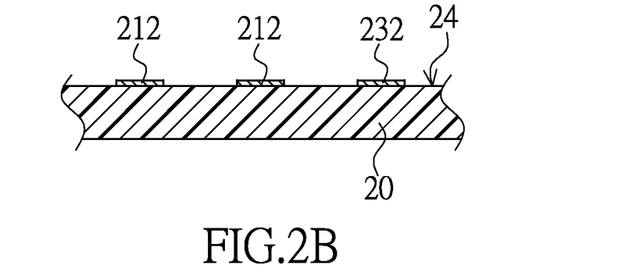
FIG. 2B is an AA cross-sectional schematic view of the structure of the FIG. 2A.

Please refer to FIG. 2B, which shows an AA cross-sectional schematic view of the structure of the FIG. 2A. As FIG. 2B shows, in the exemplary embodiment, the first conducting wire 212 of the first radiating portion 21 and the second conducting wire 232 of the second radiating portion 23 are disposed on a reference plane 24. The orthographic projections of the first radiating portion 21 and the second radiating portion 23 which are projected on the reference plane 24 do not overlap each other.

Figure 2C:
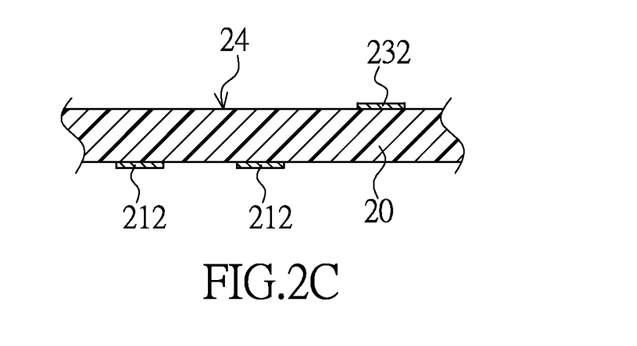
FIG. 2C is a cross-sectional schematic view of the structure of the NFC antenna in accordance with another exemplary embodiment of the present disclosure.

However, in another exemplary embodiment, the first conducting wire 212 and the second conducting wire 232 can be disposed on different reference planes. For example, please refer to FIG. 2C, which shows a cross-sectional schematic view of the structure of the NFC antenna in accordance with another exemplary embodiment of the present disclosure. The first conducting wire 212 can be disposed on an under surface of the dielectric layer 20, and the second conducting wire 232 can be disposed on the upper surface of the dielectric layer 20. Furthermore, in another exemplary embodiment, the first conducting wire 212 can be disposed on the upper surface of the dielectric layer 20 (not shown in FIG. 2C), and the second conducting wire 232 can be disposed on the under surface of the dielectric layer 20 (not shown in FIG. 2C). However, the present disclosure is not limited thereto.

In addition, the said NFC antenna 2 can be integrated into a circuit board, and the circuit board may be a rigid circuit board or a flexible circuit board. The dielectric layer 20 can be an insulating layer of the circuit board, and a material formed the dielectric layer 20 may be a prepreg. The said circuit board may be a multilayer circuit board or a single layer circuit board.

It is worth noting that, as FIG. 2A shows, in the exemplary embodiment, the second radiating portion 23 is disposed inside the first radiating portion 21, and a number of rings with which the second radiating portion 23 surrounds the axis core 22 is equal to one. However, in another exemplary embodiment, the number of rings which the second radiating portion 23 surrounds the axis core 22 can be two or more than two. In addition, the second radiating portion 23 can be disposed outside the first radiating portion 21. However, the structure of the NFC antenna 2 should not be limited to examples provided herein. Those skilled in the art can design the structure of the NFC antenna 2 in response to actual requirements.

Incidentally, both of the first conducting wire 212 and the second conducting wire 232 are metal pattern layers, and the first conducting wire 212 and the second conducting wire 232 are disposed on the same surface. Besides, in the exemplary embodiment, both of the first conducting wire 212 and the second conducting wire 232 are formed by the metal pattern layers with a uniform line width. However, in another exemplary embodiment, the first conducting wire 212 and the second conducting wire 232 can be formed by the metal pattern layers with a non-uniform line width. In addition, the first conducting wire 212 and the second conducting wire 232 can be formed on the dielectric layer 20 by a printing or etching technique, and form the first radiating portion 21 and the second radiating portion 23 respectively. However, the present disclosure is not limited thereto.

In the exemplary embodiment, the first conducting wire 212 of the first radiating portion 21 surrounds the axis core 22 with the spiral structure. A distance between an innermost ring of the first conducting wire 212 and the second conducting wire 232 of the second radiating portion 23 is uniform. However, in another exemplary embodiment, when the number of rings which the second radiating portion 23 of the second conducting wire 232 surrounds the axis core 22 is two or more than two (the second conducting wire 232 is still a spiral structure), the distance between the innermost ring of the first conducting wire 212 and an outermost ring of the second conducting wire 232 can be non-uniform. However, those skilled in the art can design the structure of the NFC antenna 2 according to actual requirements. The present disclosure does not limit the structure of the NFC antenna 2.

Next, in the exemplary embodiment, the spiral structures of the first conducting wire 212 and the second conducting wire 232 are square ring structures which surround the same axis core 22. However, in another exemplary embodiment, a shape of each ring of the square ring structures may be a circle, a triangle, or an oval. The shape of each ring of the square ring structures should not be limited by the example of the instant embodiment.

In the exemplary embodiment, the first signal input terminal 211 and the second signal input terminal 231 are configured to receive an input signal. In addition, since the second radiating portion 23 includes the open end 233, only the first signal output terminal 213 outputs an output signal.

It is worth noting that, in one preferred exemplary embodiment, the distance between the first conducting wire 212 and the second conducting wire 232 is uniform, and both of the line widths of the first conducting wire 212 and the second conducting wire 232 are uniform. For example, the first radiating portion 21 of the NFC antenna 2 is formed by the spiral structure with plural number of rings, and distance between each of the rings of the first conducting wire 212 is uniform. Furthermore, the line width of the first conducting wire 212 is uniform. Accordingly, the first radiating portion 21 of the NFC antenna 2 forms an inductor. Similarly, the second radiating portion 23 of the NFC antenna 2 is also formed by the spiral structure with a plural number of rings, and the distance between each of the rings of the second conducting wire 232 is uniform. Furthermore, the line width of the second conducting wire 232 is uniform. Accordingly, the second radiating portion 23 of the NFC antenna 2 forms another inductor. Moreover, the first conducting wire 212 is disposed proximate to the second conducting wire 232. Hence, a parasitic capacitor is formed between the first conducting wire 212 and the second conducting wire 232. Based upon the above description, the NFC antenna 2 shown by FIG. 2A can be equivalent to an equivalent circuit shown by FIG. 2D.

Figure 2D:
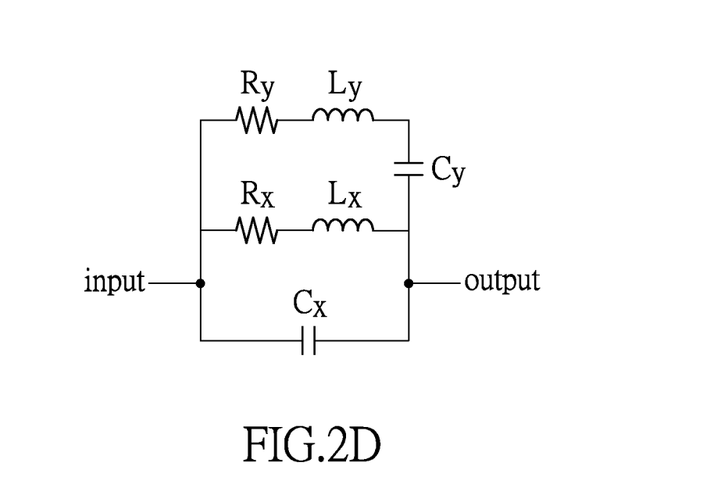
FIG. 2D is an equivalent circuit of the NFC antenna of FIG. 2A.

Please refer to FIG. 2D, which shows an equivalent circuit of the NFC antenna of FIG. 2A. As FIG. 2D shows, the NFC antenna 2 is formed by the first radiating portion 21 and the second radiating portion 23. The first radiating portion 21 is equivalent to a resistor Rx, an inductor Lx and a capacitor Cx as a first equivalent circuit. The second radiating portion 23 is equivalent to a resistor Ry, an inductor Ly and a capacitor Cy as a second equivalent circuit. The parasitic capacitor is formed between the first equivalent circuit and the second equivalent circuit (not shown in FIG. 2D). In addition, both of the first radiating portion 21 and the second radiating portion 23 surround the same axis core 22, such that the first radiating portion 21 and the second radiating portion 23 can be equivalent to the first equivalent circuit connected to the second equivalent circuit in parallel.

Further to say, as FIG. 2D shows, since the first equivalent circuit and the second equivalent circuit are connected in parallel, the inductor Lx of the first equivalent circuit and the inductor Ly of the second equivalent circuit are also connected in parallel. Those skilled in the art should be able to understand that the parallel inductor Lx and Ly causes a total inductance of the NFC antenna 2 to be reduced. It can be seen that the inductor Lx of the first equivalent circuit and the inductor Ly of the second equivalent circuit is configured to adjust the total inductance of the NFC antenna 2. On the other hand, the resistor Rx of the first equivalent circuit and the resistor Ry of the second equivalent circuit are also connected in parallel. Those skilled in the art should be able to understand that the parallel resistor Rx and Ry causes a total resistance of the NFC antenna 2 to be reduced.

Based upon the above description, both of the total inductance and the total resistance of the NFC antenna 2 can be reduced, such that a quality factor of the NFC antenna 2 is improved, and a signal attenuation of the output signal outputted from an output terminal of the NFC antenna 2 is reduced.

Other Exemplary Embodiment

Figure 3:
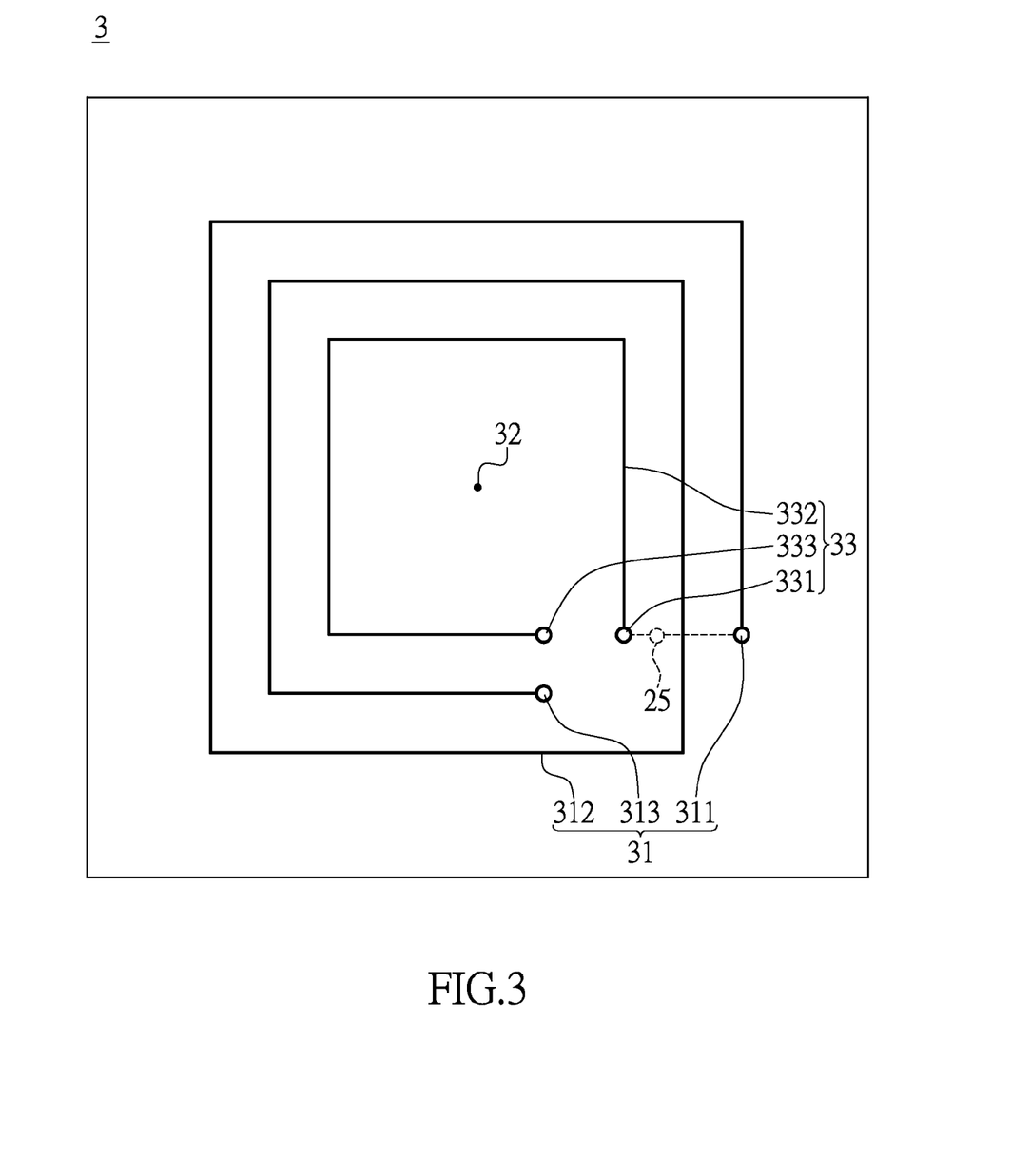
FIG. 3 is a schematic diagram of a NFC antenna in accordance with another exemplary embodiment of the present disclosure.

Please refer to FIG. 3, which shows a schematic diagram of a NFC antenna in accordance with another exemplary embodiment of the present disclosure. A structure and an efficacy of a NFC antenna 3 of the exemplary embodiment are similar to that of the NFC antenna 2 described above. For example, a second radiating portion 33 of the NFC antenna 3 also can improve a quality factor of the NFC antenna 3 and reduce a signal attenuation of an output signal, such that the NFC antenna 3 can provide a longer transmission distance. The difference between the NFC antenna 3 and the NFC antenna 2 is, positions of a first signal input terminal 311, a first signal output terminal 313, a second signal input terminal 331 and a open end 333 of the NFC antenna 3 shown by FIG. 3 opposite to that of the NFC antenna 2 shown by FIG. 2A.

In other words, the first signal input terminal 311 is disposed outside a first radiating portion 31, and the first signal output terminal 313 is disposed inside the first radiating portion 31. In addition, the second signal input terminal 331 of a second radiating portion 33 is disposed corresponding to the first signal input terminal 311 of the first radiating portion 31. The open end 333 of the second radiating portion 33 is disposed proximate to the first signal output terminal 313. That is to say, the first radiating portion 31 is formed by a first conducting wire 312 surrounding an axis core 32 with a spiral structure. A second conducting wire 332 of the second radiating portion 33 surrounds the axis core 32 based on the surrounding direction with which the first radiating portion 21 surrounds the axis core 32. Furthermore, the efficacy provided by the NFC antenna 3 is similar to the NFC antenna 2. Since the efficacy provided by the NFC antenna 2 has been described, further descriptions are hereby omitted.

Another Exemplary Embodiment

Figure 4:
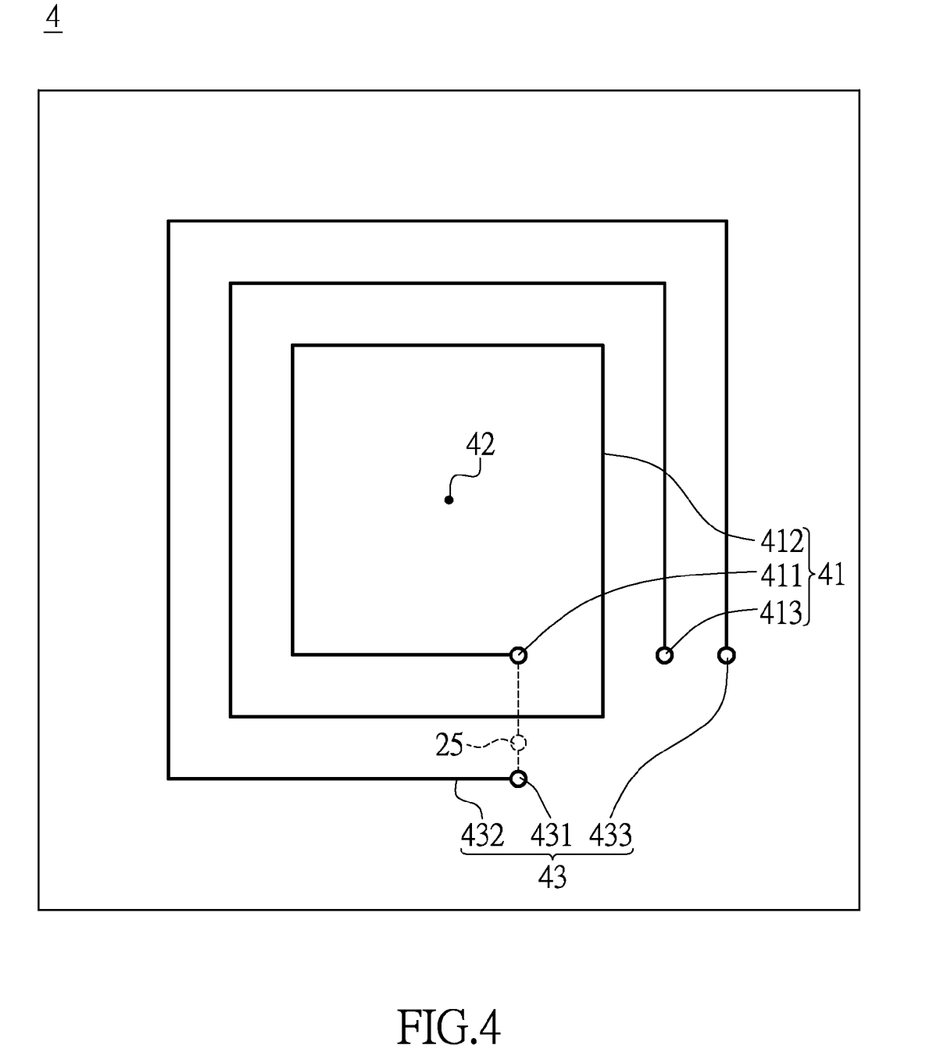
FIG. 4 is a schematic diagram of a NFC antenna in accordance with another exemplary embodiment of the present disclosure.

Please refer to FIG. 4, which shows a schematic diagram of a NFC antenna in accordance with another exemplary embodiment of the present disclosure. A structure and an efficacy of a NFC antenna 4 of the exemplary embodiment are similar to that of the NFC antenna 2 and 3 which the exemplary embodiment described above. For example, a second radiating portion 43 of the NFC antenna 4 also can improve a quality factor of the NFC antenna 4 and reduce a signal attenuation of an output signal, such that the NFC antenna 4 can provide a longer transmission distance. The difference between the NFC antenna 4, the NFC antenna 2 and 3 is, the second radiating portion 43 shown by FIG. 4 is disposed outside a first radiating portion 41. Since the efficacy provided by the NFC antenna 4 is similar to the NFC antenna 2 and 3 described above, further descriptions are hereby omitted.

To put it concretely, a first signal input terminal 411 is disposed inside the first radiating portion 41, and a first signal output terminal 413 is disposed outside the first radiating portion 41. Furthermore, a second signal input terminal 431 of a second radiating portion 43 is disposed corresponding to the first signal input terminal 411 of the first radiating portion 41. An open end 433 is disposed corresponding to the first signal output terminal 413. However, in another exemplary embodiment, the first signal input terminal 411 also can be disposed outside the first radiating portion 41, and the first signal output terminal 413 also can be disposed inside the first radiating portion 41. Those skilled in the art can design the NFC antenna in response to actual requirements, and the present disclosure is not limited thereto.

Possible Result of Exemplary Embodiment

In summary, a NFC antenna and an electronic device provide by the exemplary embodiment of the present disclosure can reduce the interferences affected from surrounding metal elements by disposing a second radiating portion around a first radiating portion. Next, since the second radiating portion is disposed around the first radiating portion, a quality factor of the NFC antenna can be improved, such that the NFC antenna can provide a longer transmission distance. Concurrently, the NFC antenna provided by the present disclosure has a simple structure and the NFC antenna is easy to manufacture. In other words, a cost of manufacturing the NFC antenna dramatically decreases.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A near field communication (NFC) antenna, comprising:
   a first radiating portion, formed by a first conducting wire surrounding an axis core, the first radiating portion comprising a first signal input terminal and a first signal output terminal; and
   a second radiating portion, formed by a second conducting wire surrounding the same axis core based on a surrounding direction which the first radiating portion surrounds the axis core, the second radiating portion comprising a second signal input terminal and an open end, the second signal input terminal is electrically connected to the first signal input terminal, and the open end is disposed proximate to the first signal output terminal.

2. The NFC antenna according to claim 1, wherein the first conducting wire is electrically connected to the first signal input terminal and the first signal output terminal, the second conducting wire is electrically connected to the second signal input terminal and the open end.

3. The NFC antenna according to claim 2, wherein the second radiating portion is disposed inside the first radiating portion.

4. The NFC antenna according to claim 3, wherein the first conducting wire surrounds the axis core with a spiral structure.

5. The NFC antenna according to claim 4, wherein the spiral structure is a square ring structure.

6. The NFC antenna according to claim 3, wherein the second conducting wire surrounds the axis core by at least one ring.

7. The NFC antenna according to claim 2, wherein the second radiating portion is disposed outside the first radiating portion.

8. The NFC antenna according to claim 7, wherein the first conducting wire surrounds the axis core with a spiral structure.

9. The NFC antenna according to claim 8, wherein the spiral structure is a square ring structure.

10. The NFC antenna according to claim 7, wherein the second conducting wire surrounds the axis core by at least one ring.

11. The NFC antenna according to claim 1, wherein the NFC antenna further comprises a dielectric layer, the first radiating portion and the second radiating portion are disposed on the same surface of the dielectric layer, or respectively disposed on two surfaces of the dielectric layer.

12. The NFC antenna according to claim 1, wherein both of the first conducting wire and the second conducting wire are metal pattern layers.

* * * * *